United States Patent

[11] 3,616,404

[72] Inventor Lawrence A. Gregory
St. Paul, Minn.

[21] Appl. No. 860,725
[22] Filed Sept. 24, 1969
[45] Patented Oct. 26, 1971
[73] Assignee Precision Magnetics, Inc.

[54] COMPUTER INFORMATION STORAGE DEVICE AND METHOD FOR MAKING THE SAME
8 Claims, 9 Drawing Figs.

[52] U.S. Cl. .......... 204/192, 340/174
[51] Int. Cl. .......... C23c 15/00
[50] Field of Search .......... 204/192; 340/174 PW, 174 MA

[56] References Cited
UNITED STATES PATENTS

| | | | |
|---|---|---|---|
| 3,534,343 | 10/1970 | Sallet .......... | 340/174 |
| 2,760,036 | 8/1956 | Raymer .......... | 204/192 |
| 2,712,126 | 6/1955 | Rosenberg et al. .......... | 340/174 |
| 2,702,270 | 2/1955 | Donahue et al. .......... | 204/192 |

*Primary Examiner*—John H. Mack
*Assistant Examiner*—Sidney S. Kanter
*Attorney*—Bair, Freeman & Molinare ABSTRACT: The apparatus aspect of the disclosure describes a computer information storage device comprising a wire, a magnetic material substantially surrounding the wire, and a coating located between the wire and the magnetic material for providing a smooth surface on which the magnetic material may be deposited. The coating also provides a barrier that prevents diffusion of the wire into the magnetic material.

INVENTOR.
LAWRENCE A. GREGORY
BY
Bair, Freeman & Molinare
ATTORNEYS

INVENTOR.
LAWRENCE A. GREGORY

BY
Bair, Freeman & Molinare

ATTORNEYS

COMPUTER INFORMATION STORAGE DEVICE AND METHOD FOR MAKING THE SAME

BACKGROUND OF THE INVENTION

This invention primarily relates to computer information storage devices and methods for producing the same, and is more specifically directed to information storage devices employing wires coated with a magnetic material.

In recent years, plated-wire memories (i.e., plated wire information devices) have gained increasing acceptance in the computer industry. Plated wire memories are generally fabricated by immersing an array of wires in a plating solution that is used to deposit a coating of magnetic material on the wires. Thereafter, the wires are individually inserted in molded epoxy tunnels that are encircled by etched word drive lines. The wires and drive lines are then connected to appropriate electrical circuitry in order to operate the memory.

Although plated wire memories of the foregoing type have certain advantages over conventional ferrite core memories, they still exhibit deficiencies that limit their overall usefulness. For example, experience has shown that the surface roughness of the wire used in such memories must be reduced in order to produce memories of uniformly high quality. However, since the plating process cannot proceed unless the substrate material is a relatively good electrical conductor, the techniques available for the reduction of surface roughness are necessarily limited and have not been effective. The unavailability of a successful means for significantly reducing surface roughness necessitates the application of a relatively thick coating of magnetic material on the wires employed in a plated-wire memory. However, a coating of the requisite thickness tends to have an adverse effect on the performance of the resulting memory device.

In addition to the foregoing deficiencies, the plated wires of known plated-wire memories normally exhibit magnetostrictive properties (i.e., their magnetic characteristics change as forces are applied to them). As a result, the wires of such memories must be carefully mounted so that they will not be subjected to varying forces at any point along their lengths. In order to meet this requirement, the wires are normally individually mounted in molded epoxy tunnels, or the like. The molded epoxy tunnels are difficult to form since they must support the wires along their entire lengths and yet allow sufficient space for thermal expansion. As a result, they substantially complicate the process of fabricating a completed memory device, and thereby substantially increase the cost of production.

It is a primary object of the present invention to provide improved methods and apparatus for reducing the surface roughness of wire to which a coating of magnetic material is to be applied.

Still another object of the present invention is to provide improved methods and apparatus for controlling the coating of a wire with magnetic materials so that the resulting coated wire exhibits virtually no magnetostrictive properties.

Yet another object of the present invention is to provide improved apparatus and methods of mounting coated wires to a circuit board without the necessity of employing tunnel structures and the like.

Still another general object of the present invention is to provide an improved method of manufacturing information storage devices.

Yet another object of the present invention is to provide an improved wire-coated information storage apparatus.

SUMMARY OF THE INVENTION

In order to overcome the deficiencies of the prior art, and to achieve the foregoing objects, the present invention, in principal method aspect, basically comprises a method of producing an information storage device comprising wires coated with a magnetic material. In order to perform the method, the wires are formed into a specific geometrical array and are cleaned. Thereafter the wires are coated with a coating substance that dries to form a smooth, heat-resistant surface. The array of wires is then placed in a deposition chamber adjacent a mass of the magnetic material. The deposition chamber is then evacuated and an area surrounding the array in the chamber is heated to a predetermined temperature in order to remove contaminants from the wires. The temperature in the area surrounding the array is then reduced, and a magnetic field is directed into the area. In order to coat the wires, atoms of the magnetic material are expelled from the mass and are directed into the area surrounding the array. As a result, the wires are uniformly coated with the magnetic material. When the magnetic material attains a desired thickness on the wires, the expulsion of the atoms is stopped, and the array is cooled while the magnetic field is maintained. Thereafter, the array is removed from the deposition chamber.

By using the foregoing method, any appropriate coating substance (i.e., either an insulating or a conducting substance) may be used in order to reduce the surface roughness of the wires employed. This feature drastically increases the variety of usable substances in comparison with prior art plated-wire methods that must employ techniques in which the exposed wire surface comprises an electrical conductor. By using an appropriate coating substance, such as a silicate, the wire is provided with a glasslike smooth surface that substantially improves the uniformity of the resulting magnetic coating and provides an effective barrier against diffusion of the wire into the magnetic material.

Use of the process results in an improved information storage device comprising a wire, a coating of magnetic material having a predetermined thickness that substantially surrounds the wire, and means located between the wire and the coating for providing a smooth surface on which the magnetic material may be deposited. Experience has shown that the magnetic coating used in the present invention is more dense and has less inhomogeneity than the coating used in prior art plated film memories. Accordingly, the requisite thickness of the magnetic coating is substantially reduced, thereby reducing the amount of magnetic material needed for a given output voltage. This feature results in faster line recovery and shorter cycle time.

Applicant has also found that the composition of the magnetic material applied to the wires may be controlled with great accuracy by use of the methods taught herein. By properly controlling the composition of magnetic material applied to the wires, the resulting coated wires exhibit virtually no magnetostrictive properties. As a result, the coated wires may be mounted on a circuit board by merely applying a conventional adhesive material. This feature completely eliminates the requirement for delicate tunnel structures employed by prior art information storage devices. As a result, the cost of production is substantially reduced and the ruggedness and durability of the resulting memory device is immeasurably increased.

DESCRIPTION OF THE DRAWINGS

These and other objects, advantages, and features of the present invention will hereinafter appear for purposes of illustration, but not of limitation, in connection with the accompanying drawings in which like numbers refer to like parts throughout, and in which.

DESCRIPTION OF THE PREFERRED EMBODIMENTS

Figures 1, 6, 7, 8:
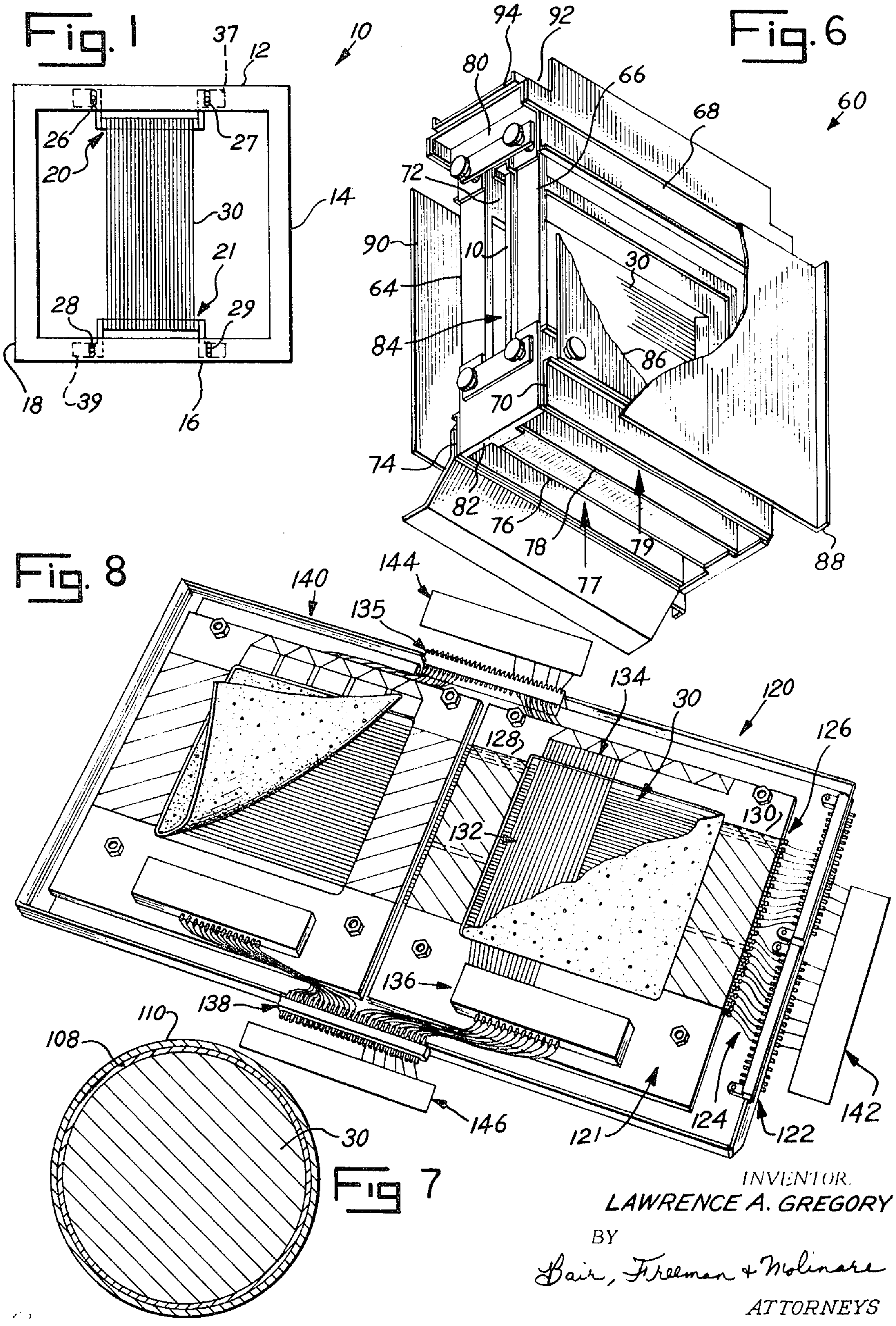
FIG. 1 is a partially schematic, front elevational view of a preferred form of jig used in connection with the present invention in order to form a wire into a predetermined geometrical array.
FIG. 6 is an enlarged, perspective view of the sputtering fixture portion of the deposition apparatus, shown together with the jig placed in its operative position therein.
FIG. 7 is an enlarged cross-sectional view of an exemplary wire that has been treated according to the teachings of the present invention.
FIG. 8 is a perspective view of a preferred form of a coated-wire array made in accordance with the present invention and mounted on an exemplary circuit board in order to form an information storage device.
Figures 2, 2A, 2B:
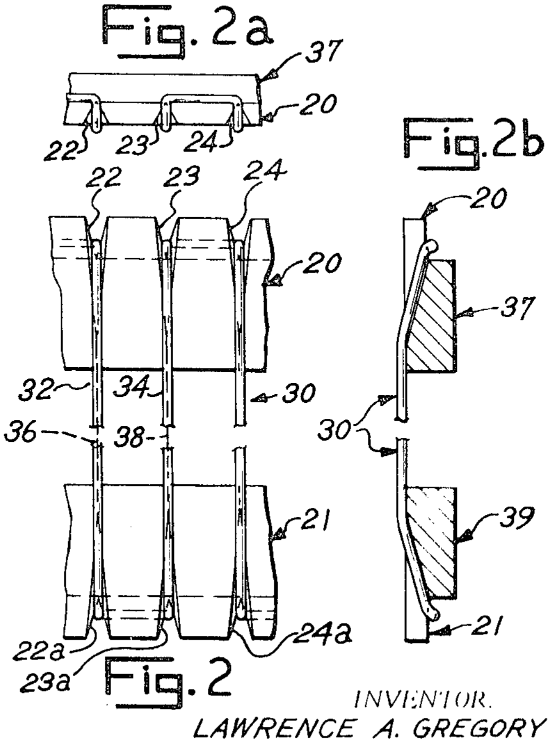
FIG. 2 is a fragmentary, enlarged view of the jig shown in FIG. 1, together with segments of the wire mounted thereon.
FIG. 2*a* is a top plan view of the apparatus shown in FIG. 2.
FIG. 2*b* is a side elevational view of the apparatus shown in FIG. 2.

As previously described, one aspect of the present invention is directed to a method of producing an information storage device comprising a wire coated with a magnetic material. A preferred method of practicing the invention includes the step of forming the wire into an array in which the center lines of segments of the wire are aligned parallel to each other and at a predetermined distance from each other. A preferred form of apparatus used in performing this step of the method is illustrated in FIGS. 1, 2, **2*a*, and 2*b*. As shown in the drawings, the wire is formed into an array on a jig 10 that comprises side members 12, 14, 16 and 18 arranged as shown. A support member 20 is movably mounted on side member 12, and an identical support member 21 is movably mounted on side member 16. The support members each comprise grooves, such as exemplary V-shaped grooves 22–24 that are arranged opposite grooves 22*a*–24*a*. respectively (FIG. 2). As shown in FIG. 1, a wire 30 is strung in the grooves of members 20 and 21 in order to form segments such as exemplary segments 32 and 34 having center lines 36 and 38, respectively (shown in dotted lines in FIG. 2). Member 20 is positioned by a brace 37 that is, in turn, releasably mounted to the jig by bolts 26 and 27. Likewise, member 21 is positioned by a brace 39 that is releasably mounted to the jig by bolts 28 and 29**.

As explained in detail later, members 20 and 21 may be moved toward each other by loosening bolts 26–29, thereby providing slack in wire 30 in order to aid the stringing process. Subsequently, the support members may be securely affixed to their respective side members by tightening the bolts.

As previously described, the preferred method aspect of the present invention also comprises the step of placing an array of wire segments formed on jig 10 adjacent a mass of magnetic material in a deposition chamber. A preferred form of apparatus used to carry out this step of the method is illustrated in FIGS. 3–6. As shown in the drawings, the apparatus basically comprises deposition apparatus 40 that incorporates many features of well-known cathodic sputtering devices. More specifically, deposition apparatus 40 comprises a conventional bell jar 42 that defines a deposition chamber 44. The bell jar is adapted to comate with a base 46 that houses a conventional filament assembly 48. The filament assembly includes a filament 50 that provides a source of electrons that are directed into chamber 44. In order to produce the electrons, the filament is heated by applying an electrical potential to conductors 52 and 54. When the filament is energized, the electrons are directed through a horizontal channel 56 and a vertical channel 57 into chamber 44. Because of its resistance to ion bombardment, tungsten wire is normally used for the filament. Its power consumption and physical size are dependent upon the number of emitted electrons necessary to sustain a specific value of anode current and may be determined by well-documented techniques once the required anode current is known. A typical preferred filament comprises a 4-inch W wire 0.035 inches in diameter that is operated at 6 to 8 volts and 46 to 50 amps.

Base 46 is integrally formed with a duct 58 that is connected to a conventional oil-diffusion pump (not shown). The pump is used to evacuate chamber 44 in a well-known manner. An inert gas, such as argon, may then be introduced into the chamber via a micrometer valve (not shown).

A sputtering fixture 60 that is adapted to hold jig 10 is mounted above vertical channel 57 on top of a mounting plate 61. As best shown in FIG. 6, fixture 60 comprises left and right front vertical members 64 and 66, respectively, and corresponding left and right rear vertical members (not shown). The vertical members are positioned by upper and lower right horizontal members 68 and 70, respectively, and by upper and lower left horizontal members 72 and 74, respectively. An inner panel 76 cooperates with lower left horizontal member 74 in order to define a left plasma chimney 77. LIkewise, an inner panel 78 cooperates with lower right horizontal member 70 in order to define a right plasma chimney 79. The horizontal and vertical members are positioned and held together by upper and lower front brackets 80 and 82, respectively, and by corresponding upper and lower rear brackets (not shown).

Figure 5:
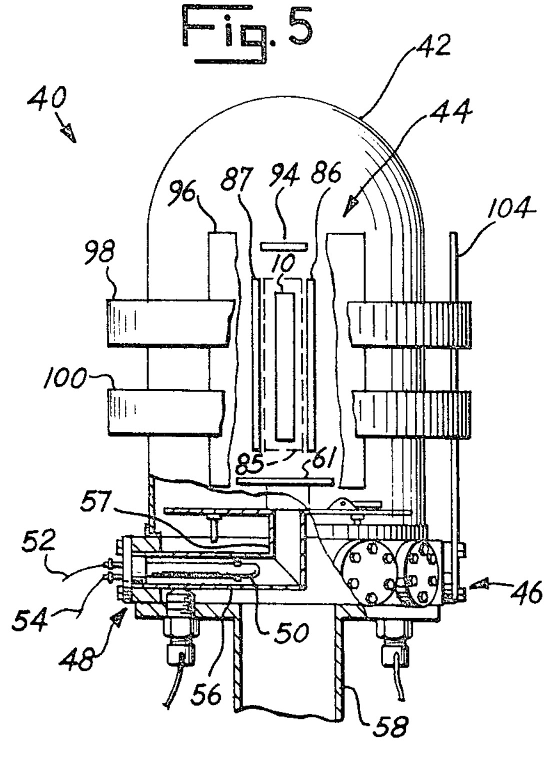
FIG. 5 is a schematic, partially fragmentary view of certain portions of the apparatus shown in FIG. 4.

Still referring to FIG. 6, the inner edges of front vertical members 64 and 66 define a slot 84 that is adapted to receive jig 10. When the jig is inserted in the slot, wire 30 is exposed to a right target mass of magnetic material 86 and a left target mass of magnetic material 87 (FIG. 5). According to the preferred practice of the invention, the target masses are identical and each comprise a 1/32-inch thick sheet consisting of about 81.5 percent nickel and 18.5 percent iron, for a DRO zero magnetostrictive magnetic alloy, and about 80 percent nickel, 17 percent iron and 3 percent cobalt for a NDRO zero magnetostrictive alloy. As shown in FIG. 6, the target masses are spaced 8 to 12 centimeters apart and are parallel to each other and to the array of wire segments positioned on jig 10. In addition, the jig and wire array are centered between the target masses in an area 85 that surrounds the array.

Right and left demagnetizing shields 88 and 90, respectively, are utilized to help collimate the electrons supplied by filament 50. The electrons are attracted to an anode 94 that is attached to a top piece 92. The anode is attached to an electrical voltage supply so that a potential drop of about 50–60 volts exists between the anode and filament.

A cylindrical shield 96 surrounds the entire sputtering fixture 60 during the deposition process in order to minimize the internal heat loss to the bell jar.

The bell jar is surrounded by an upper magnetic coil 98 and a lower magnetic coil 100. The coils are energized from a source of electrical current (not shown) in order to provide a constant magnetic field of predetermined value in area 85 surrounding the wire array. The coils are supported on vertical posts 102, 103 and 104.

The preferred form of the method aspect of the present invention will now be described in connection with the apparatus shown in FIGS. 1–6. According to the preferred practice of the invention, a 5 mil diameter copper or beryllium-copper wire 30 is strung along the grooves in support members 20 and 21 in the manner shown in FIGS. 1 and 2. In order to facilitate the stringing process, the bolts holding one of the support members are loosened so that the member may be slid toward the center of the jig. After the stringing process has been completed, the loosened member is restored to its original position, thereby placing an equal amount of tension of all of the wire segments. Thereafter, the loosened bolts are tightened so that wire 30 is securely held in the geometrical array shown in FIG. 1. Applicant has discovered that best results are achieved when the center lines of the wire segments (e.g., center lines 36 and 38) are each spaced 30 to 50 mils apart, although it is possible to make an acceptable device in which a spacing of only 15 to 20 mils is employed.

After wire 30 is formed into an appropriate array, the wire is cleaned in five separate steps. In the first step, the array is thoroughly immersed in trichloroethylene ($C1_2CH—CH_2C1$), and in the second step, the array is immersed in acetone ($CH_3COCH_3$ or methanol ($CH_3OH$). In the third step, the array is immersed in a solution of 5 to 20 percent nitric acid ($HNO_3$), with the time of immersion varying inversely with the concentration of nitric acid. In the fourth step, the array is immersed in a solution of 10 to 100 percent sodium hydroxide (NaOH), with the immersion time varying inversely with the concentration of sodium hydroxide. In the fifth step, the array is rinsed profusely with distilled water.

After the array has been rinsed, the wire is immediately coated with a coating substance comprising a silicate, such as potassium silicate ($K_2SiO_3$). Other materials, such as sodium silicant ($Na_2SiO_3$), may also be used, the critical property being high temperature resistance in order to withstand deposition temperatures. Some care must be taken in order to coat the wire with an appropriate thickness of the coating substance. The thickness required depends on the surface roughness of wire 30, and if the coating is applied too thickly, it will flake off. However, one skilled in the art can quickly determine the requisite thickness on a trial-and-error basis. The coating substance performs two important functions. It provides the wire surface with a glasslike smoothness that eliminates the inherent imperfections of the original wire surface, and the substance creates a barrier against diffusion of the wire into the deposited film of magnetic material.

After the coating substance has been applied, the jig and wire array are slid through slot 84 in sputtering fixture 60 to the position shown in FIG. 6. As previously mentioned, it is important that the right and left target masses be spaced about 8 to 12 centimeters apart and parallel to each other, and that jig 10 be centered between the masses.

Figures 3, 4:
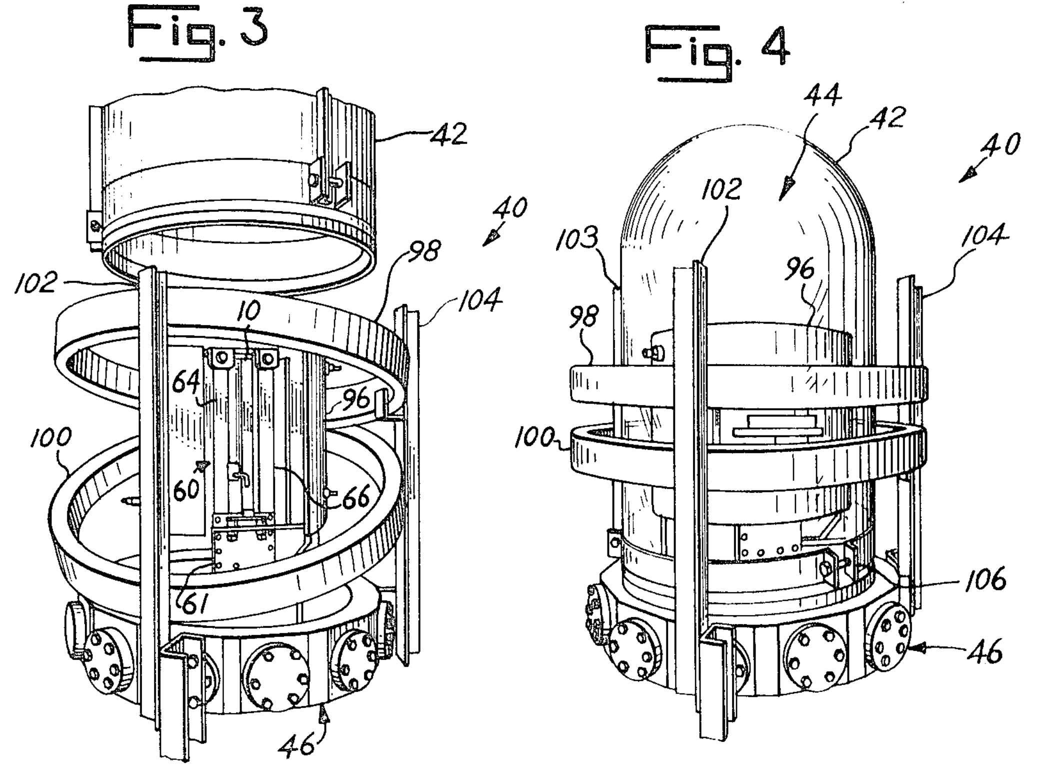
FIG. 3 is a fragmentary, perspective view of a preferred form of deposition apparatus used in connection with the present invention, together with the jig shown in FIG. 1 mounted therein.
FIG. 4 is a perspective view of the deposition apparatus shown in FIG. 3 with the parts thereof in their operative positions.

After the jig is in place in sputtering fixture 60, shield 96 is closed around the fixture, and bell jar 42 is lowered to the position shown in FIG. 4 by cables attached to a clamp 106. Chamber 44 is then evacuated by the oil-diffusion pump (not shown), and the chamber is back-filled with argon to a pressure of about 1 micron. The upper and lower magnetic coils 98 and 100, respectively, are then moved to the positions shown in FIG. 4. The coils are energized in order to establish a constant magnetic field of 60 oersteds in area 85 immediately surrounding the wire array. A gettering material, such as titanium, is then evaporated into the bell jar in order to minimize background pressure to a negligible value.

Thereafter, the chamber is preheated by electrical heaters (not shown) to a temperature high enough to insure removal of all contaminants from the surface of wire 30. Applicant has found that a minimum of 400° C. bake-out is necessary.

After bake-out is completed, the temperature in the chamber 44 is reduced to about 275° C.

Deposition of the magnetic material in masses 86 and 87 on the wire array is then initiated by energizing filament 50 and connecting anode 94 to a source of potential. The anode voltage is a function of required anode current and argon pressure. Nominal values at 1 micron argon pressure are 50 to 60 volts at 0.05 amps per square inch of target surface. Target masses 86 and 87 are also connected to a source of potential negative with respect to the anode and generally on the order of 400 to 800 volts. The target voltages act as a vernier deposition temperature control.

Plasma chimneys 77 and 79 are positioned so as to collimate the electrons emitted from filament 50 in the spaces between the target masses and the jig. Demagnetizing shields 88 and 90 together with the magnetic field created by coils 98 and 100, further collimate the electrons and supply a homogenous orientation field for the deposition of a magnetic film on the wire array.

The electrons emitted by filament 50 flow toward the anode and create ions by contact with the gas in chamber 44. The ions generated in the gas strike target masses 86 and 87, thereby expelling atoms of the magnetic material from the masses. The expelled atoms of the magnetic material are directed into area 85 so that wire 30 is thereby coated with the magnetic material. An exemplary coated wire 30 resulting from this process is shown in FIG. 7. Coated wire 30 comprises a coating substance 108 and a film coating of magnetic material 110.

After the requisite thickness of magnetic material has been deposited on wire 30, deposition apparatus 40 is deenergized and the wire is allowed to cool to about 100° C. while the orientation field supplied by coils 98 and 100 is maintained. Although the magnetic film thickness is dependent upon magnetic specification requirements, applicant has found that optimal results are achieved when the thickness of magnetic material is between 1,000 and 3,000 angstroms. This thickness is considerably less than the thickness of magnetic material typically required by plated wire memories, and, in part, accounts for the superior performance of the wire memories made according to the present invention.

After the wire array has cooled, jig 10 is removed from chamber 44, and the magnetic film coating 110 is tested for average characteristics by inserting the array in the test field of a B–H loop tester. The wire array is also tested for its magnetostrictive properties. Applicant has found that the composition of magnetic film coating 110 may be closely controlled by the methods disclosed herein so that the resulting coated wire array exhibits virtually no magnetostrictive properties. Since the zero magnetostrictive property of the above-described iron-nickel and cobalt-iron-nickel target alloys occurs at specific ratios of alloy materials, and the sputtering process emits these materials from the targets without altering the ratios, it become necessary only to control the background partial pressure of reactive gases in the bell jar during deposition in order to minimize the altering of material ratios during transit from target to substrate by molecular reaction with said background gases. For example, in an atmosphere of argon and oxygen ($O_2$) having a total pressure of 1.0 micron in which 0.1 microns of the total pressure is due to the presence of the $O_2$, approximately 10 percent of the expelled atoms will react with $O_2$ forming nonmagnetic iron-oxide $Fe_2O_3$. This will reduce the effective percentage of iron in the deposited material by 6 6⅔ percent of its original value. Therefore a nonmagnetostrictive material of 20 percent iron content would have approximately 19 percent iron content after deposition under these conditions and would become magnetostrictive.

In order to deposit a nonmagnetostrictive material, it is necessary to either control the background pressure to a known value of known constituents and select a corresponding alloy, or to minimize the background pressure to a negligible value. The latter is more easily accomplished by introducing a gettering material, such as titanium, into the bell for prior to deposition. The getting material reacts with most of the background pressure gases effectively removing them. Therefore, the nominal zero nominal alloy may be chosen for targets and negligible altering will take place during deposition. As previously mentioned, this aspect of the invention eliminates the requirements for delicate and costly tunnel structures that are generally employed in connection with prior art plated wire memories.

If the magnetic and magnetostrictive properties of coated wire 30 are satisfactory, the wire array may be conveniently attached to a circuit board in the manner shown in connection with FIG. 8. More specifically, the wire array may be attached to an exemplary ground-plane-type circuit board 120 having a planar surface 121. In accordance with conventional practice, circuit board 120 has a continuous sheet of ground-plane conducting material (normally copper) laminated to its front. The copper is covered with a layer of insulation and the coated wires are attached to this surface. For situations where a return conductor other than a ground plane is required, individual word return lines may be etched in the ground plane before attaching the coated wires. At its right-hand side, circuit board 120 comprises a connector 122 and associated conductors 124 and terminals 126. Analogous apparatus may be provided at the left-hand side of the circuit board.

In order to fabricate a completed information storage device, a jig and wire array prepared in the above-described manner are positioned in contact with surface 121 so that the end portions of the wire segments comprising the array extend into and beyond areas 128 and 130. An adhesive, such as an acrylic plastic, is then simultaneously applied to areas 128 and 130 and to the end portions of the wire segments extending into areas 128 and 130. After the adhesive has set, the wire segments are separated from each other, and the jig is removed. Thereafter, the adhesive provides a means for spacing the wire segments with respect to each other and for securing the wire segments to the circuit board. The ends of the wire segments may then be soldered or welded to the circuit board circuitry, such as terminals 126.

The preparation of the information storage device is completed by attaching word strap conductors 132 between conductors 134 and circuitry 136 in a well-known manner.

Conductors 134 and circuitry 136, in turn, are connected to appropriate connectors 135 and 138, respectively. Accordingly, the coated-wire segments and the word strap conductors may be connected to voltage sources 142, 144, and 146 through connectors 122, 135 and 138, respectively. The voltage sources also comprise switching circuitry whereby particular wire segments and word strap conductors may be selectively energized. By properly switching the voltage sources, the stage of magnetization of magnetic film coating 110 adjacent the intersection of a wire segment and a word strap conductor may be altered in a manner well known to those skilled in computer arts. This technique enables information to be stored in the device in a conventional manner.

Circuit board 140 is included in FIG. 8 in order to describe how the circuit board appears after the wire array has been attached, but before the word strap conductors have been connected.

As shown in FIG. 8, the information storage device may be fabricated by merely attaching the wire segments to the circuit board adjacent their end points, without utilizing any additional supporting apparatus, such as tunnel structures, adjacent the midpoints of the segments. Accordingly, the cost of fabrication compared with prior art plated-wire memories is substantially reduced. Moreover, repair of the device may be easily achieved by merely loosening the adhesive in the areas 128 and 130 and removing the particular wire that requires replacement.

Those skilled in the art will recognize that the particular embodiments described herein may be altered and modified to some extent without departing from the spirit and scope of the invention.

What is claimed is:

1. A method of producing an information storage device comprising a wire coated with a magnetic material, said method comprising the steps of:
   - forming the wire into an array in which the center lines of segments of said wire are aligned parallel to each other and at a predetermined distance from each other;
   - cleaning the wire;
   - coating the wire with a coating substance that dries to form a smooth, heat-resistant surface;
   - placing the array adjacent a target of said magnetic material in a deposition chamber;
   - evacuating the deposition chamber;
   - heating an area surrounding the array in the deposition chamber to a predetermined temperature in order to remove contaminants from said coated wire;
   - reducing the temperature in the area surrounding the array;
   - directing a magnetic field into the area surrounding the array;
   - sputtering said magnetic material from said target;
   - directing said sputtered material into the area surrounding the array so that the wire is thereby coated with said magnetic material;
   - stopping the sputter deposition when the coating of magnetic material attains a predetermined thickness on the wire;
   - cooling the array and simultaneously maintaining said magnetic field;
   - removing the array from the deposition chamber;
   - arranging electrical conductors adjacent to the coated segments of said wire;
   - and severing at least one of said segments from said wire; whereby when said severed segment and at least one of said conductors are connected to a source of electrical power information may be stored in the magnetic material coated on said severed segment.

2. A method, as claimed in claim 1, wherein the step of forming the wire into an array comprises the steps of:
   - arranging the center lines of said segments 30 to 50 mils apart; and
   - placing an equal amount of tension on each segment of the wire.

3. A method, as claimed in claim 1, wherein the step of cleaning the wire comprises the steps of:
   - applying trichloroethylene ($Cl_2CH-CH_2Cl$) to the wire;
   - applying acetone ($CH_3COCH_3$) or methanol ($CH_3OH$) to the wire;
   - applying a nitric acid ($HNO_3$) solution to the wire;
   - applying a sodium hydroxide (NaOH) solution to the wire; and
   - rinsing the wire in distilled water.

4. A method, as claimed in claim 1, wherein the coating substance comprises a silicate.

5. A method, as claimed in claim 1, wherein the coating substance comprises a material selected from the group consisting of potassium silicate ($K_2SiO_3$), and sodium silicate ($Na_2SiO_3$).

6. A method, as claimed in claim 1, wherein said predetermined temperature exceeds 400° C.

7. A method, as claimed in claim 1, wherein the sputter deposition is stopped when the thickness of the coating of magnetic material on the wire is between 1000 angstroms and 3000 angstroms.

8. A method, as claimed in claim 1, wherein the steps of arranging electrical conductors adjacent to the coated segments of said wire comprises the steps of:
   - positioning the segments in contact with a circuit board;
   - applying an adhesive to the segments and the circuit board simultaneously;
   - placing the electrical conductors over the segments; and
   - connecting the electrical conductors to predetermined sections of the circuit board.

* * * * *